(12) United States Patent
Chen et al.

(10) Patent No.: US 8,908,545 B1
(45) Date of Patent: Dec. 9, 2014

(54) SYSTEM AND METHOD FOR HANDLING TCP PERFORMANCE IN NETWORK ACCESS WITH DRIVER INITIATED APPLICATION TUNNEL

(75) Inventors: Jonathan Chen, Santa Clara, CA (US); Saxon Amdahl, Mountain View, CA (US); Andrey Shigapov, Fremont, CA (US)

(73) Assignee: F5 Networks, Inc., Seattle, WA (US)

( * ) Notice: Subject to any disclaimer, the term of this patent is extended or adjusted under 35 U.S.C. 154(b) by 433 days.

(21) Appl. No.: 12/832,880

(22) Filed: Jul. 8, 2010

(51) Int. Cl.
*H04L 12/26* (2006.01)
*H04L 29/06* (2006.01)
*H04L 12/46* (2006.01)

(52) U.S. Cl.
CPC ...... *H04L 12/4633* (2013.01); *H04L 29/06612* (2013.01); *H04L 63/0281* (2013.01); *H04L 63/0272* (2013.01); *H04L 29/06551* (2013.01); *H04L 63/029* (2013.01)
USPC .......................................................... 370/252

(58) Field of Classification Search
USPC ............................ 370/252, 338, 389; 709/227
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

MacVittie, Lori, "Message-Based Load Balancing," Technical Brief, Jan. 2010, pp. 1-9, F5 Networks, Inc.

(Continued)

*Primary Examiner* — Hoon J Chung
*Assistant Examiner* — Yaotang Wang
(74) *Attorney, Agent, or Firm* — LeClairRyan, a Professional Corporation (57) ABSTRACT

A system and method for improving TCP performance in a L2 tunneling environment by snooping TCP/IP packets from the tunnel interface, terminating TCP locally and proxying TCP data in separate TCP connections. In particular, the system and method detects an encapsulated outgoing packet utilizing a Layer 2 tunneling protocol, processes a Point to Point Protocol layer in the outgoing packet to establishing Layer 2 tunneling protocol for a connection. The system and method also removes the Point to Point Protocol layer from the outgoing packet and inspects the outgoing packet for TCP information in the packet. The system and method forwards the outgoing packet to a locally driven application protocol path if TCP information is present, wherein the outgoing packet is encapsulated in association with the application protocol path.

15 Claims, 5 Drawing Sheets

(56) References Cited

U.S. PATENT DOCUMENTS

| | | |
|---|---|---|
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,624,424 B2 | 11/2009 | Morita et al. |
| 7,801,978 B1 | 9/2010 | Susai et al. |
| 7,908,314 B2 | 3/2011 | Yamaguchi et al. |
| 8,130,650 B2 | 3/2012 | Allen, Jr. et al. |
| 8,380,854 B2 | 2/2013 | Szabo |
| 8,447,871 B1 | 5/2013 | Szabo |
| 2001/0023442 A1 | 9/2001 | Masters |
| 2002/0059428 A1 | 5/2002 | Susai et al. |
| 2002/0138615 A1 | 9/2002 | Schmeling |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0070069 A1 | 4/2003 | Belapurkar et al. |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0145233 A1 | 7/2003 | Poletto et al. |
| 2003/0225485 A1 | 12/2003 | Fritz et al. |
| 2004/0117493 A1 | 6/2004 | Bazot et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0154837 A1 | 7/2005 | Keohane et al. |
| 2005/0187866 A1 | 8/2005 | Lee |
| 2005/0262238 A1 | 11/2005 | Reeves et al. |
| 2006/0031520 A1 | 2/2006 | Bedekar et al. |
| 2006/0059267 A1 | 3/2006 | Cugi et al. |
| 2006/0156416 A1 | 7/2006 | Huotari et al. |
| 2006/0161577 A1 | 7/2006 | Kulkarni et al. |
| 2006/0171365 A1* | 8/2006 | Borella .................. 370/338 |
| 2006/0233106 A1 | 10/2006 | Achlioptas et al. |
| 2006/0242300 A1 | 10/2006 | Yumoto et al. |
| 2007/0016662 A1 | 1/2007 | Desai et al. |
| 2007/0064661 A1* | 3/2007 | Sood et al. ............... 370/338 |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0174491 A1 | 7/2007 | Still et al. |
| 2008/0034136 A1 | 2/2008 | Ulenas |
| 2008/0133518 A1 | 6/2008 | Kapoor et al. |

(56) References Cited

U.S. PATENT DOCUMENTS

| | | | |
|---|---|---|---|
| 2008/0134311 | A1 | 6/2008 | Medvinsky et al. |
| 2008/0148340 | A1 | 6/2008 | Powell et al. |
| 2008/0256224 | A1 | 10/2008 | Kaji et al. |
| 2008/0301760 | A1 | 12/2008 | Lim |
| 2009/0049230 | A1 | 2/2009 | Pandya |
| 2009/0125625 | A1 | 5/2009 | Shim et al. |
| 2009/0141891 | A1 | 6/2009 | Boyen et al. |
| 2009/0228956 | A1 | 9/2009 | He et al. |
| 2009/0287935 | A1 | 11/2009 | Aull et al. |
| 2010/0023582 | A1 | 1/2010 | Pedersen et al. |
| 2010/0122091 | A1 | 5/2010 | Huang et al. |
| 2010/0150154 | A1* | 6/2010 | Viger et al. ............ 370/389 |
| 2010/0242092 | A1 | 9/2010 | Harris et al. |
| 2010/0251330 | A1 | 9/2010 | Kroeselberg et al. |
| 2010/0325277 | A1 | 12/2010 | Muthiah et al. |
| 2011/0040889 | A1 | 2/2011 | Garrett et al. |
| 2011/0047620 | A1 | 2/2011 | Mahaffey et al. |
| 2011/0066718 | A1 | 3/2011 | Susai et al. |
| 2011/0173295 | A1 | 7/2011 | Bakke et al. |
| 2011/0282997 | A1 | 11/2011 | Prince et al. |
| 2011/0321122 | A1 | 12/2011 | Mwangi et al. |
| 2012/0066489 | A1 | 3/2012 | Ozaki et al. |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"A Process for Selective Routing of Servlet Content to Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

Schaefer, Ken, "IIS and Kerberos Part 5—Protocol Transition, Constrained Delegation, S4U2S and S402P," Jul. 18, 2007, 21 pages, http://www.adopenstatic.com/cs/blogs/ken/archive/2007/07/19/8460.aspx.

"Servlet/Applet/HTML authentication process with single sign-on," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Williams et al., The Ultimate Windows Server 2003 System Administrator's Guide: Forwarding Authentication, 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

F5 Networks Inc., "Configuration Guide for Local Traffic Management," F5 Networks Inc., Jan. 2006, version 9.2.2, 406 pgs.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

* cited by examiner

FIG. 5

SYSTEM AND METHOD FOR HANDLING TCP PERFORMANCE IN NETWORK ACCESS WITH DRIVER INITIATED APPLICATION TUNNEL

TECHNOLOGICAL FIELD

This technology generally relates to improving network efficiency and in particular, to a system and method for improving TCP performance in network access with driver initiated application tunnel.

BACKGROUND

The common implementation of achieving network (L3) connectivity in SSL-VPN is to encapsulate data from the network layer (e.g. IP datagrams) with some link (L2) layer protocol and send data from L2 (e.g. PPP frames) over a SSL/TLS connection. Most, if not all, SSL-VPN vendors encounter poor performance when sending data through their SSL-VPN tunnels due to head of line blocking (when multiple L3 traffic are encapsulated within a SSL/TLS connection and loss occurs, TCP that transports the SSL/TLS connection must recover from loss and during recovery other encapsulated L3 traffic whose data not affected by the loss will not be sent. Datagram Transport Layer Security (DTLS), which uses UDP (User Datagram Protocol) as the transport instead of TCP, is used as an alternative to SSL/TLS-in SSL-VPN to avoid head of line blocking problem. However, the compression ratio achievable on a DTLS-based VPN tunnel is not as effective as that of the SSL/TLS-based VPN tunnel, since the compression history is limited to the maximum segment size of a DTLS packet, thereby resulting in potential loss. In comparison, SSL/TLS-based VPN tunnels provide for a larger compression history, thereby achieving a higher compression ratio.

Tunneling data from L3 within L2 over a secure connection (regardless SSL/TLS or DTLS) carries a number of disadvantages, in particular, tunneling data from one source endpoint to another destination endpoint incurs the overhead from these two layers (L2 and L3), which can be substantial.

SUMMARY

In an aspect, a method comprises detecting an encapsulated outgoing data packet utilizing a Layer 2 protocol. The method includes processing a Point to Point Protocol layer in the outgoing packet for establishing a connection to a VPN tunnel for the data packet. The method includes removing the Point to Point Protocol layer from the outgoing data packet. The method includes inspecting the outgoing data packet for TCP information in the data packet and processing the outgoing data packet in accordance with a locally driven application protocol path if TCP information is present the data packet, wherein the outgoing data packet is encapsulated in association with the application protocol path.

In an aspect, a machine readable medium having stored thereon instructions, comprising machine executable code which when executed by at least one machine, causes the machine to detect an encapsulated outgoing data packet utilizing a Layer 2 driver. The code causes the machine to process a Point to Point Protocol layer in the outgoing data packet for establishing Layer 2 tunneling to a VPN connection. The code causes the machine to remove the Point to Point Protocol layer from the outgoing data packet. The code causes the machine to inspect the outgoing data packet for TCP information. The code causes the machine to forward the outgoing data packet to a locally driven application protocol path if TCP information is present in the data packet, wherein the outgoing data packet is encapsulated in association with the application protocol path.

In an aspect, a client device comprises a network interface for detecting an encapsulated outgoing data packet utilizing a Layer 2 driver. The client device includes a controller for processing a Point to Point Protocol layer in the outgoing data packet for establishing Layer 2 tunneling to a VPN connection. The controller removes the Point to Point Protocol layer from the outgoing data packet and inspects the outgoing data packet for TCP information in the packet. The controller is configured to forward the outgoing data packet to a locally driven application protocol path via the network interface if TCP information is present, wherein the outgoing data packet is encapsulated in association with the application protocol path.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Figure 1:
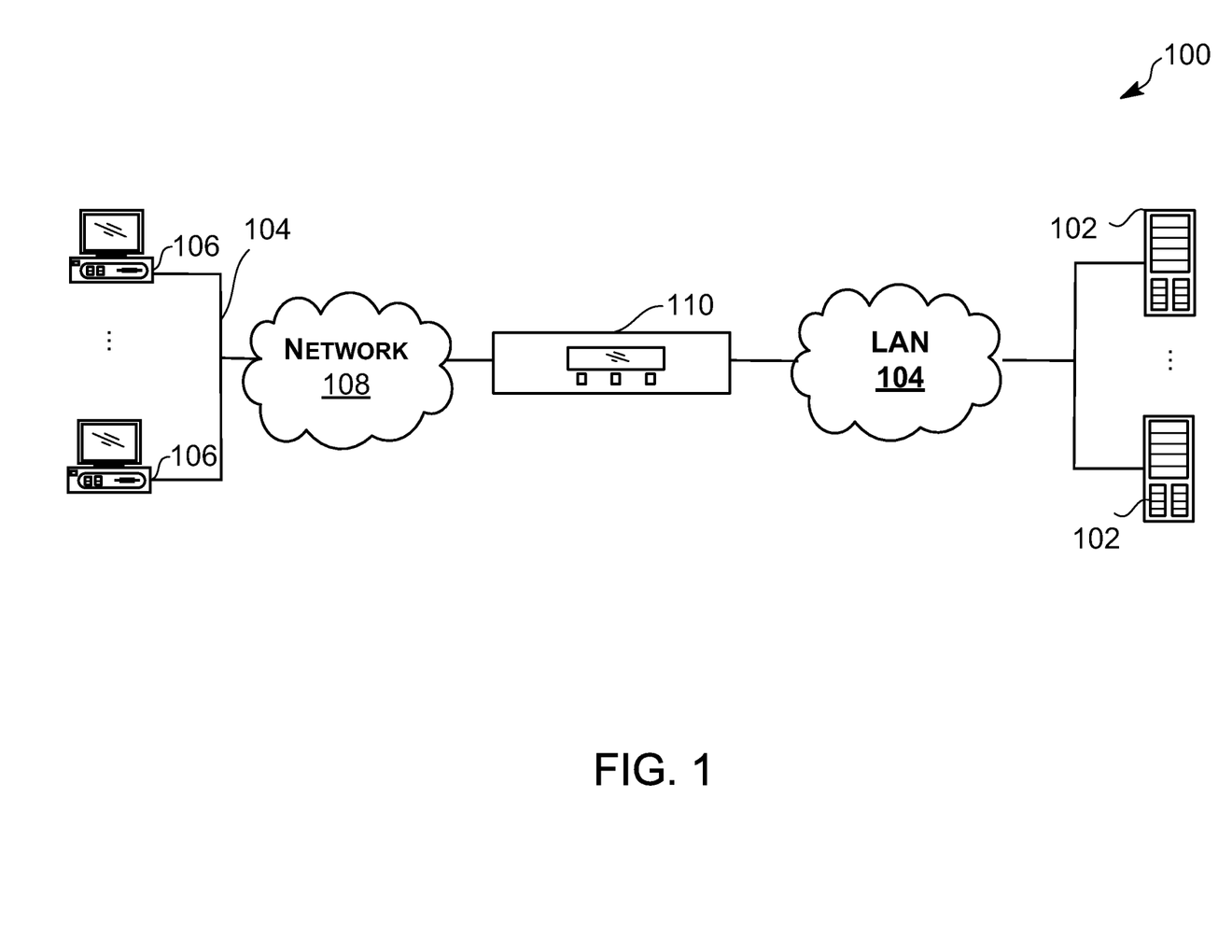
FIG. 1 is a diagram of an example system environment that improves TCP performance over a VPN configuration.

FIG. 1 illustrates a example system environment 100 includes one or more servers 102 operating a secure network domain, whereby one or more servers 102 are configured to run a Virtual Private Network (VPN) software. The system environment includes one or more client devices 106 and one or more traffic management devices 110, although the environment 100 could include other numbers and types of devices in other arrangements.

The network traffic management device 110 is coupled to the servers 102 via local area network (LAN) 104 and client devices 106 via network 108. Generally, requests sent over the network 108 from client devices 106 towards servers 102 are received by traffic management device 110.

Client devices 106 comprise computing devices capable of connecting to other computing devices, such as network traffic management device 110, thereby indirectly connecting with the servers over a VPN connection. Such connections are performed over wired and/or wireless networks, such as network 108, to send and receive data, such as for Web-based and non Web-based requests, receiving responses to requests and/or performing other tasks, in accordance with the processes described below in connection with the present disclosure. Non-limiting and non-exhausting examples of such devices include personal computers (e.g., desktops, laptops), mobile and/or smart phones and the like.

In an example, client devices 106 run Web browsers that may provide an interface for operators, such as human users, to interact with for making requests for resources to different web server-based applications or Web pages via the network 108, although other server resources may be requested by clients. One or more Web-based applications may run on the web application server 102 that provide the requested data back to one or more exterior network devices, such as client devices 106. One or more of the client devices also include client side software which allows the client device 106 to connect to the secure network using a VPN tunneling connection.

Network 108 comprises a publicly accessible network, such as the Internet, which includes client devices 106. However, it is contemplated that the network 108 may comprise other types of private and public networks that include other devices. Communications, such as requests from clients 106 and responses from servers 102, take place over the network 108 according to standard network protocols, such as the HTTP and TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between client devices 106, servers 102 and network traffic management device 110, and the like.

LAN 104 comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108 and thus will not be described further.

The one or more servers 102 comprise one or more server computing machines capable of operating one or more Web-based applications as well as one or more VPN tunneling applications that may be accessed by network devices in the network 108. Such network devices include client devices 106, via the network traffic management device 110, and may provide other data representing requested resources, such as particular Web page(s), image(s) of physical objects, and any other objects, responsive to the requests. It should be noted that the server 102 may perform other tasks and provide other types of resources. It should be noted that while only two servers 102 are shown in the environment 100 depicted in FIG. 1, other numbers and types of servers may be coupled to the network traffic management device 110. It is also contemplated that one or more of the servers 102 may be a cluster of servers managed by the network traffic management device 110. It is also contemplated that the client devices 106 may connect to the servers 102 using a VPN connection without the use of the network traffic management device 110.

As per the TCP/IP protocols, requests from the requesting client devices 106 may be sent as one or more streams of data packets over network 108 to the network traffic management device 110 and/or the servers 102 over a VPN connection. Such protocols can establish connections, send and receive data for existing connections, and the like. It is to be understood that the one or more servers 102 may be hardware and/or software, and/or may represent a system with multiple servers that may include internal or external networks. In this example, the servers 102 may be Web application servers such as Microsoft® IIS servers or Apache® servers, although other types of servers may be used. Further, additional servers may be coupled to the network 108 and many different types of applications may be available on servers coupled to the network 108.

Each of the servers 102 and client devices 106 may include one or more central processing units (CPUs), one or more computer readable media (i.e., memory), and interface systems that are coupled together by internal buses or other links as are generally known to those of ordinary skill in the art.

As shown in the example environment 100 depicted in FIG. 1, the network traffic management device 110 is interposed between client devices 106 in network 108 and the servers 102 in LAN 104. Again, the environment 100 could be arranged in other manners with other numbers and types of devices. Also, the network traffic management device 110 is coupled to network 108 by one or more network communication links and intermediate network devices (e.g. routers, switches, gateways, hubs and the like) (not shown). It should be understood that the devices and the particular configuration shown in FIG. 1 are provided for exemplary purposes only and thus are not limiting.

Generally, the network traffic management device 110 manages network communications, which may include one or more client requests and server responses, from/to the network 108 between the client devices 106 and one or more of the servers 102 in LAN 104. These requests may be destined for one or more servers 102, and may take the form of one or more TCP/IP data packets originating from the network 108. In an aspect, the requests pass through one or more intermediate network devices and/or intermediate networks, until they ultimately reach the traffic management device 110. In any case, the network traffic management device 110 may manage the network communications by performing several network traffic related functions involving the communications. Such functions include load balancing, access control, and validating HTTP requests using JavaScript code that are sent back to requesting client devices 106 in accordance with the processes described herein.

Figure 2:
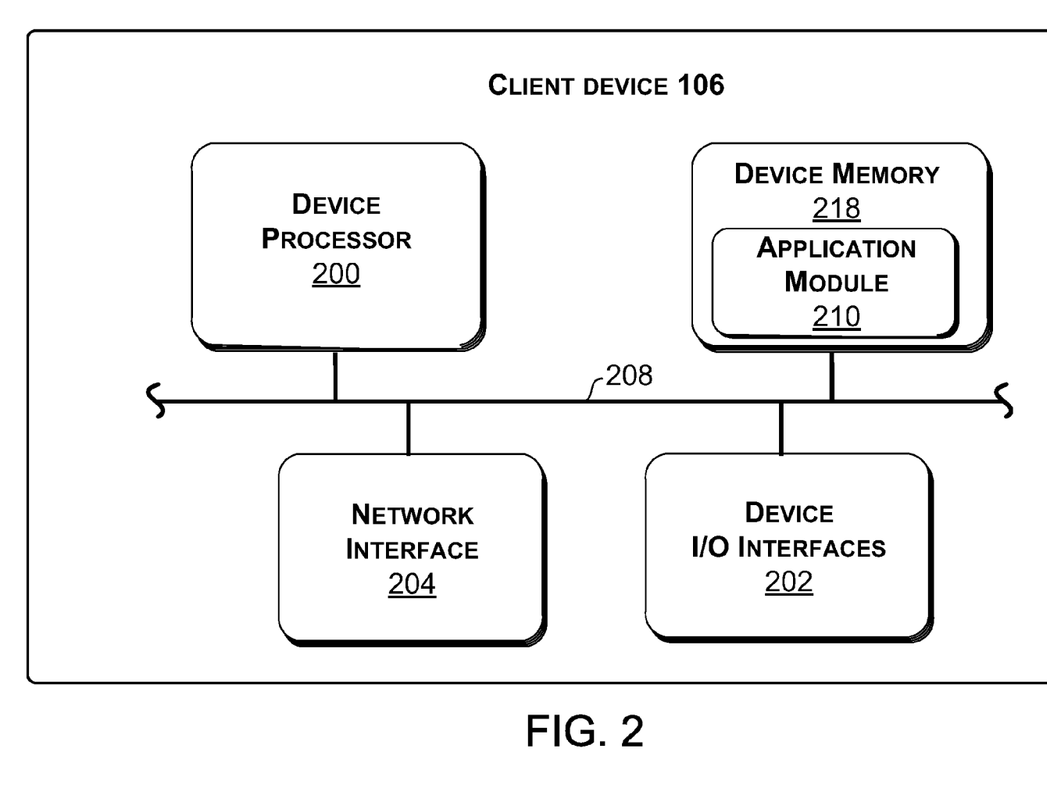
FIG. 2 is a block diagram of a client device shown in FIG. 1.

Referring now to FIG. 2, an example client device 106 includes a device processor 200, device I/O interfaces 202, network interface 204 and device memory 218, which are coupled together by bus 208. It should be noted that the device 110 could include other types and numbers of components.

Device processor 200 comprises one or more microprocessors configured to execute computer/machine readable and executable instructions stored in device memory 218. Such instructions implement network traffic management related functions of the client device 106. In addition, the instructions implement the application module 210 to perform one or more portions of the processes illustrated in FIG. 3. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor is programmed or configured according to the teachings as described and illustrated in the present disclosure.

Device I/O interfaces 202 comprise one or more user input and output device interface mechanisms. The interface may include a computer keyboard, mouse, display device, and the corresponding physical ports and underlying supporting hardware and software to enable the client device 106 to communicate with the outside environment. Such communication may include accepting user data input and to provide user output, although other types and numbers of user input and output devices may be used. Additionally or alternatively, as will be described in connection with network interface 204 below, the client device 106 may communicate with the outside environment for certain types of operations (e.g., configuration) via a network management port.

Network interface 204 comprises one or more mechanisms that enable the client device 106 to engage in TCP/IP communications over LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108. In an example where the client device 106 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as servers 102. Moreover, the interface 204 may include certain physical ports dedicated to receiving and/or transmitting certain types of network data, such as device management related data for configuring the client device 106.

Bus 208 may comprise one or more internal device component communication buses, links, bridges and supporting components, such as bus controllers and/or arbiters. The bus enable the various components of the network traffic management device 110, such as the processor 200, device I/O interfaces 202, network interface 204, and device memory 218, to communicate with one another. However, it is contemplated that the bus may enable one or more components of the client device 106 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

Device memory 218 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media contains computer readable/machine-executable instructions, data structures, program modules, or other data, which may be obtained and/or executed by one or more processors, such as device processor 200. Such instructions allow the processor to perform actions, including implementing an operating system for controlling the general operation of the client device 106 to perform one or more portions of the process described herein.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information. Such desired information includes data and/or computer/machine-executable instructions and which can be accessed by a computing or specially programmed device, such as client device 106.

Security module 210 is depicted in FIG. 2 as being within memory 218 for exemplary purposes only; it should be appreciated the module 210 may be alternatively located elsewhere. Generally, when instructions embodying the application module 210 are executed by the device processor 200. The security module 210 also uses additional information obtained by further analyzing collected data to identify latencies associated with particular servers, server applications or other server resources, page traversal rates, client device fingerprints and access statistics.

Furthermore, each of the devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like. The devices may be programmed according to the teachings as described and illustrated herein, as will be appreciated by those skilled in the computer, software, and networking arts.

In addition, two or more computing systems or devices may be substituted for any one of the devices in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 3A:
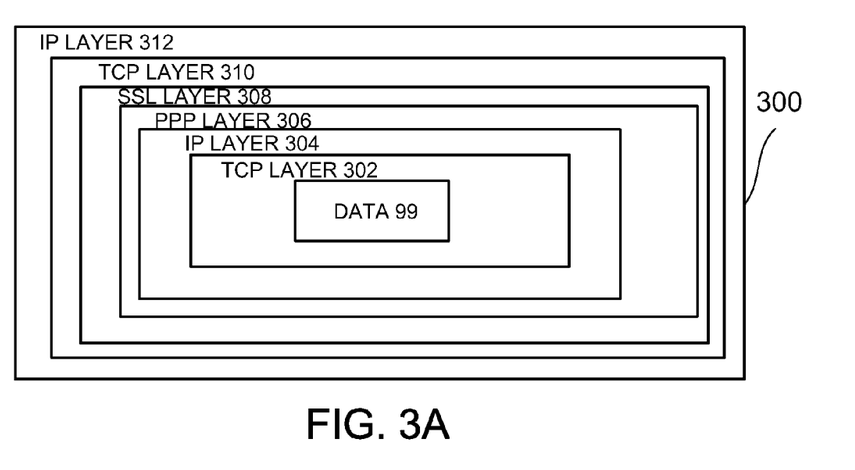
FIG. 3A is a schematic of a data packet encapsulated for according to a L2 Tunneling Protocol in accordance with an aspect of the present disclosure.

FIG. 3A illustrates a schematic of a data packet which is encapsulated as a tunneling mechanism and has routing information defined by a Layer 3 (L3) to be sent over a VPN connection In particular, the packet 300 contains data 99 which is encapsulated for L3 communications with L3 header information including a first TCP layer 302 and a first IP layer 304, which serve to encapsulate the data and form an IP datagram. In addition, the packet is further encapsulated with a L2 protocol data link layer, such as a PPP header 306, which is used as a driver to form the tunnel by which the data 99 is to be transmitted to the VPN connection. Further, the packet 300 includes a SSL encryption tunnel which comprises an SSL layer 308, a second TCP layer 310, and a second IP layer 312. The packet illustrated in FIG. 3A is designated herein as a network access packet 300, although it is not limited to the designated name. In an aspect, the network access packet 300 may be referred to herein as a L2 tunneling protocol (L2TP). However, it is contemplated that the packet 300 may include additional and/or different layers as well as utilize other protocols and headers consistent with a L2 protocol, and is thus not limited to the particular configuration of L2TP. Additionally, it should be noted that although PPP is discussed herein, other data link protocols are contemplated for use with the present system and method.

As stated above, the network access packet 300 is versatile and robust and can reliably transmit different types of communications. In addition, the network access packet 300 is able to support compression techniques which are more effective and is generally more accepted in the networking realm. However, as stated above, the network access packet 300 has significant disadvantages due to it having multiple TCP layers and substantial overhead as well as potential head of the line blocking issues.

Figure 3B:
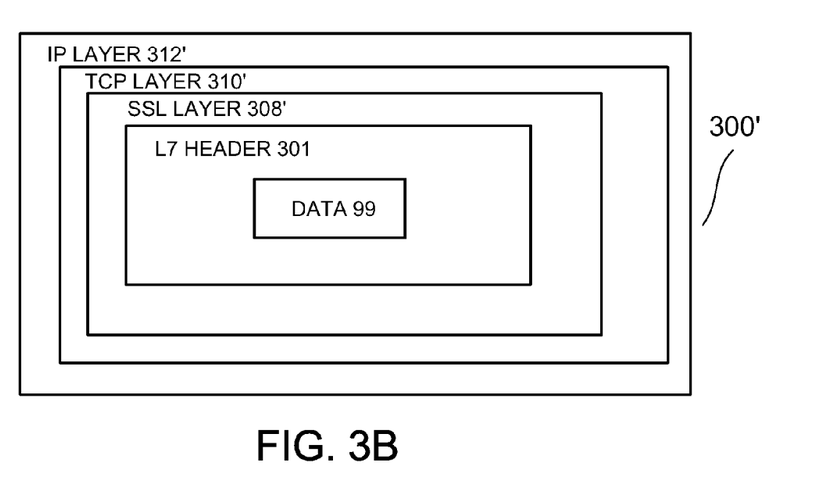
FIG. 3B is a schematic of a data packet encapsulated for according to a L7 Tunneling Protocol in accordance with an aspect of the present disclosure.

FIG. 3B illustrates a schematic of a data packet which is encapsulated and prepared for transmission to a destination entity (e.g. server, another client device and the like) using a L7 tunneling protocol. As shown in FIG. 3B, the encapsulated packet 300' contains data 99 which is packetized with a layer 7 (L7) header 301 which spans packets and provides routing information to identify where the data is to be sent. The packet 300' includes a SSL encryption layer 308', a TCP layer 310', and an IP layer 312'. The packet 300' illustrated in FIG. 3B is designated herein as an application tunnel, although it is not limited to the designated name. In addition, the network access packet 300' may include additional and/or different layers, and is thus not limited to the particular configuration shown in FIG. 3B.

Unlike the L2TP packet 300 in FIG. 3A, the application tunnel packet 300' carries substantially less overhead by way of utilizing the L7 header 301 and only one TCP layer 310' and IP layer 312'. Additionally, the L7 header 301 provides destination information for the data 99 which are associated with the IP layer 312'. Further, the L7 header 301 spans among multiple packets, thereby requiring that it only be used once for a communication session or flow, instead of per packet as with the network access packet 300 in FIG. 3A. Thus, once the application tunnel 300' is established, data 99 is passed along the tunnel without having to encapsulate each data 99 in a communication session. Additionally, the application tunnel 300' is DNS based driver which points to a locally listening process on the client device 106, such as a virtual server located on the client device 106. This allows the client device 106 to locally establish the tunnel via the ports on the client device 106. In other words, the network interface of the VPN software on the client device 106 provides a virtual tunnel to allow access to the actual VPN tunnel between the client device and the VPN software running on server 102. This translates into a faster, more effective tunneling protocol, when compared to the L2TP described in FIG. 3A, for transmitting TCP based packets to the destination entity.

However, data encapsulated using the application tunnel protocol 300' also has various disadvantages compared to the L2 tunneling protocol. For instance, the application tunnel 300' can only be used for TCP applications, and is thus not as versatile as the network access 300. In contrast, the network access 300 is more flexible as it has better ability to route the packet.

Figure 4A:
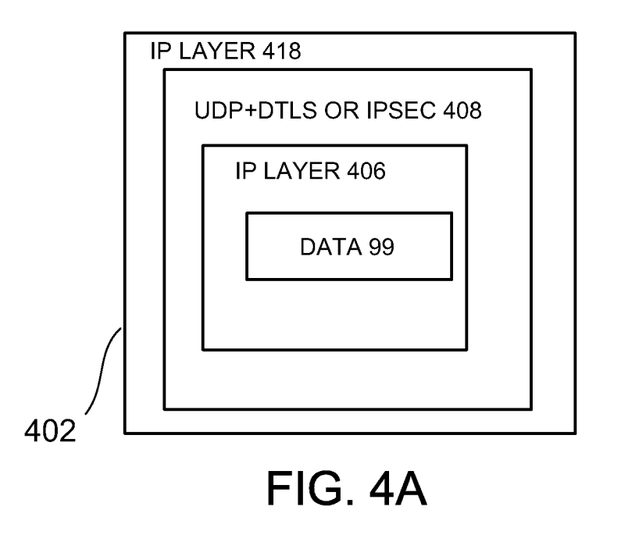
FIG. 4A is a schematic of an data packet encapsulated to have an access protocol component in accordance with an aspect of the present disclosure.
Figure 4B:
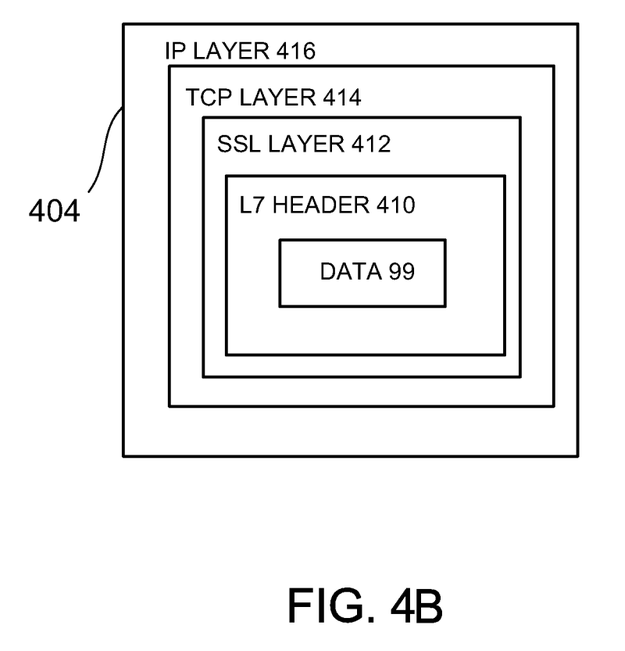
FIG. 4B is a schematic of an data packet encapsulated to have a L7 application component in accordance with an aspect of the present disclosure.

FIGS. 4A-4B illustrate schematics of encapsulated packets in accordance with an aspect of the present disclosure. In particular, the present disclosure makes use of selectively using two different protocol component paths to effectively improve performance of TCP based packets sent over a VPN connection. In particular, FIG. 4A illustrates a L2 based access protocol path 402 whereas FIG. 4B illustrates a L7 based application protocol path 404. The access protocol path 402 shown in FIG. 4A includes data 99 which is encapsulated with a first IP layer 406 and a security layer 408. In an aspect, the security layer 408 can be configured to include UDP and DTLS based protocols. In an aspect, the security layer 408 can be configured to utilize an IPsec based protocol. It should be noted that although UDP+DTLS and IPSec protocols are discussed herein, other appropriate security protocols can be utilized in the security layer 408. The packet 402 also includes an IP layer 418 which encapsulates the security layer 408. It should be noted that the access protocol path 402 may include additional and/or different layers consistent with a L2 protocol, and is thus not limited to the particular configuration shown in FIG. 4A.

The application protocol path 404 shown in FIG. 4B includes data 99 that is encapsulated with an L7 header 410 as well as an SSL layer 412 and a TCP layer 414, as shown in FIG. 4. An IP layer 416 is contained in the packet and encapsulates the TCP layer 414. It should be noted that the application component path 404 may include additional and/or different layers consistent with a L7 based protocol, and is thus not limited to the particular configuration path shown in FIG. 4B.

As will be discussed in more detail below, software on the client device 106 receives data from a tunnel interface of the client device 106, which is the local network interface of the client device 106 discussed above. The VPN software includes a protocol parser which is deployed within the client device 106 to recognize frame boundaries of the outgoing encapsulated data packet at the network interface. In particular, the protocol parser inspects the frame boundaries of the packet, such as the Network Access Protocol in FIG. 3A, and in particular the L2 PPP layer 306 to determine if the PPP layer encapsulates TCP/IP packet layers 302, 304. If TCP/IP layers are present in the data packet, the software in the client device 106 will process the packet to be transmitted in accordance with the application protocol path 404 through the VPN tunnel. In other words, the application component path 404 effectively acts as a TCP/IP proxy where the TCP connection is forwarded to the VPN tunnel using the application protocol path 404. This is done by the software on the client device 106 which effectively de-encapsulates the network access packet 300 and separates the TCP/IP layers and the data from the rest of the packet, whereby the TCP/IP layers and data is encapsulated in accordance with the access component path 404. The modified packet is then sent through the VPN tunnel.

In an aspect, prior to the data being sent over the application configuration path 404, the packet is processed to modify the network address information in the IP packet headers to point to the local process of the client device 106. As stated above, the application configuration path 404 is locally run the client device 106. Thus, the packet is subject to a network address translation process to properly point the packet to the local driver to ensure that the packet is routed properly.

Figure 5:
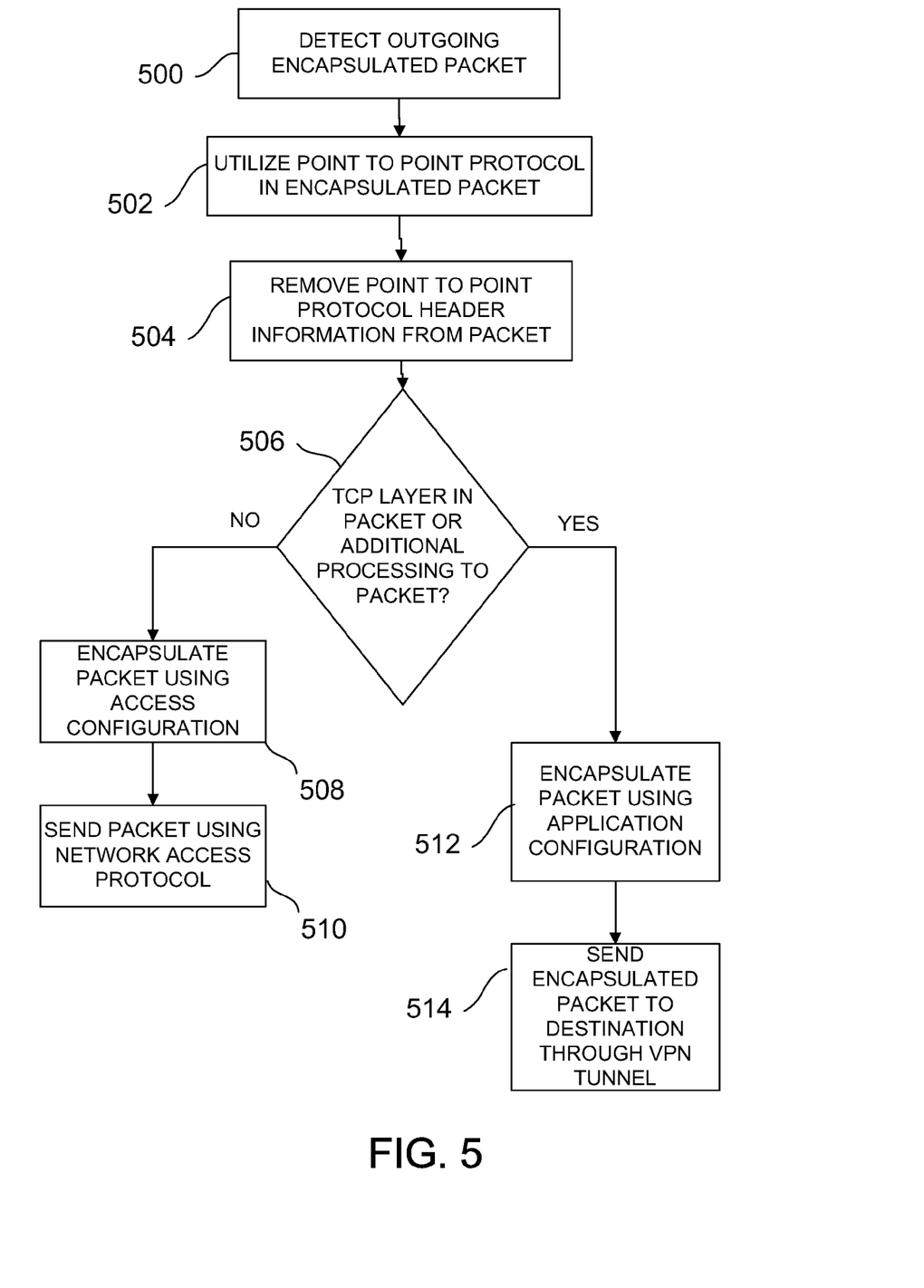
FIG. 5 is an example flow chart diagram depicting portions of processes for improving TCP performance in network access packets using a driver initiated application tunneling component in accordance with an aspect of the present disclosure.

FIG. 5 is an example flow chart diagram depicting portions of processes for improving TCP performance in network access packets using a driver initiated application tunneling component. As shown in FIG. 5, a client device 106 connects to a wide area network 108 or LAN 104 using a VPN connection (block 500). Upon the client device 106 sending an encapsulated data packet, such as 300 or 300', the software on the client device 106 effectively snoops the outgoing packet using a protocol parser and inspects the L2 tunnel interface and the PPP header information to determine routing information of the packet (block 502). Thereafter, the software removes the PPP header information from the packet as it is no longer needed (block 504). Thereafter software on the client device 106 snoops the data packet to determine whether the packet includes TCP/IP layers (block 506). If there are no TCP/IP layers in the packet, the software encapsulates the data in accordance with the protocols of the access protocol component 404 (block 508). The access configured encapsulated packet is then sent to the VPN tunnel (block 510).

In contrast, if the software on the client device 106 detects that TCP/IP layers are present in the outgoing packet, the software separates the frame/datagram from the data path of the network access packet 300 and forwards it to the application component 404 (block 512). As stated above, in an aspect, the packet undergoes a network address translation process to ensure that the packet is routed locally through the client device 106. Thereafter, the TCP connection is terminated locally on the client device 106 and the data is forwarded to the destination entity using the TCP tunnel provided via the application component 404, one per new TCP flow (block 514).

In the reverse direction, when an encapsulated data packet is to be sent to the client device 106. The network traffic management device 110 forwards the data packet sent from the server 102 to the corresponding TCP application tunnel which was used to initially send the data packet from the client device 106. Upon receiving the data packet, the software on the client device 106 reads the data from the TCP application tunnel and returns it to the application component 404. The application component 404 then adds the TCP/IP headers and encapsulates the IP datagram into a format consistent to the tunnel interface before forwarding the frame/datagram to the tunnel interface.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims.

What is claimed is:

1. A method for improving Transmission Control Protocol (TCP) performance in network access, the method comprising:
    detecting an encapsulated outgoing data packet;
    processing a Point to Point Protocol (PPP) layer in the outgoing data packet to obtain routing information for establishing a connection to a Virtual Private Network (VPN) tunnel and to determine when the PPP layer encapsulates at least TCP and Internet Protocol (IP) layers of the outgoing data packet; and
    when the PPP layer encapsulates at least TCP and IP layers of the outgoing data packet:
        removing the PPP layer including the encapsulated TCP and IP layers from the outgoing data packet; and
        processing the outgoing data packet in accordance with a locally driven application protocol path comprising encapsulating data of the outgoing data packet with a Layer 7 header in place of the removed PPP layer, wherein the application protocol path is configured to act as a TCP proxy connection over the VPN tunnel; and
    the method further comprising:
        determining when the outgoing data packet does not include a PPP layer and processing the outgoing data packet in accordance with an access configuration path when the outgoing data packet does not include a PPP layer.

2. The method of claim 1, further comprising forwarding the outgoing data packet to a destination in accordance with the application protocol path and applying a network address translation process to the outgoing data packet based on the routing information prior to the packet being forwarded.

3. The method of claim 1, wherein the processing the outgoing data packet in accordance with the access configuration path when the outgoing data packet does not include a PPP layer further comprises encapsulating the data of the outgoing data packet and a second IP layer with a security layer.

4. The method of claim 3, wherein the security layer is based on User Datagram Protocol (UDP) and Datagram Transport Layer Security (DTLS) security protocol or an Internet Protocol Security (IPSec) security protocol.

5. The method of claim 1, wherein the data of the outgoing data packet is further encapsulated by an SSL layer, a second TCP layer, and a second IP layer.

6. A non-transitory machine readable medium having stored thereon instructions for improving Transmission Control Protocol (TCP) performance in network access, the instructions comprising machine executable code which when executed by at least one machine, causes the machine to perform steps comprising:
    detecting an encapsulated outgoing data packet;
    processing a Point to Point Protocol (PPP) layer in the outgoing data packet to obtain routing information for establishing a connection to a Virtual Private Network (VPN) tunnel and to determine when the PPP layer encapsulates at least TCP and Internet Protocol (IP) layers of the outgoing data packet; and
    when the PPP layer encapsulates at least TCP and IP layers of the outgoing data packet:
        removing the PPP layer including the encapsulated TCP and IP layers from the outgoing data packet; and
        processing the outgoing data packet in accordance with a locally driven application protocol path comprising encapsulating data of the outgoing data packet with a Layer 7 header in place of the removed PPP layer, wherein the application protocol path is configured to act as a TCP proxy connection over the VPN tunnel; and
    the steps further comprising:
        determining when the outgoing data packet does not include a PPP layer and processing the outgoing data packet in accordance with an access configuration path when the outgoing data packet does not include a PPP layer.

7. The machine readable medium of claim 6, further having stored thereon instructions comprising machine executable code which when executed by the at least one machine further causes the machine to perform steps further comprising forwarding the outgoing data packet to a destination in accordance with the application protocol path and applying a network address translation process to the outgoing data packet based on the routing information prior to the packet being forwarded.

8. The machine readable medium of claim 6, wherein the processing the outgoing data packet in accordance with the access configuration path when the outgoing data packet does not include a PPP layer further comprises encapsulating the data of the outgoing data packet and a second IP layer with a security layer.

9. The machine readable medium of claim 8, wherein the security layer is based on User Datagram Protocol (UDP) and Datagram Transport Layer Security (DTLS) security protocol or an Internet Protocol Security (IPSec) security protocol.

10. The machine readable medium of claim 6, wherein the data of the outgoing data packet is further encapsulated by an SSL layer, a second TCP layer, and a second IP layer.

11. A client device comprising:
a processor coupled to a memory and configured to be capable of executing programmed instructions for improving Transmission Control Protocol (TCP) performance in network access stored in the memory to perform steps comprising:
detecting an encapsulated outgoing data packet;
processing a Point to Point Protocol (PPP) layer in the outgoing data packet to obtain routing information for establishing a connection to a Virtual Private Network (VPN) tunnel and to determine when the PPP layer encapsulates at least TCP and Internet Protocol (IP) layers of the outgoing data packet; and
when the PPP layer encapsulates at least TCP and IP layers of the outgoing data packet:
removing the PPP layer including the encapsulated TCP and IP layers from the outgoing data packet; and
processing the outgoing data packet in accordance with a locally driven application protocol path comprising encapsulating data of the outgoing data packet with a Layer 7 header in place of the removed PPP layer, wherein the application protocol path is configured to act as a TCP proxy connection over the VPN tunnel; and
the steps further comprising:
determining when the outgoing data packet does not include a PPP layer and processing the outgoing data packet in accordance with an access configuration path when the outgoing data packet does not include a PPP layer.

12. The client device of claim 11, wherein the processor is further configured to be capable of executing programmed instructions stored in the memory to perform steps further comprising forwarding the outgoing data packet to a destination in accordance with the application protocol path and applying a network address translation process to the outgoing data packet based on the routing information prior to the packet being forwarded.

13. The client device of claim 11, wherein the processing the outgoing data packet in accordance with the access configuration path when the outgoing data packet does not include a PPP layer further comprises encapsulating the data of the outgoing data packet and a second IP layer with a security layer.

14. The client device of claim 13, wherein the security layer is based on User Datagram Protocol (UDP) and Datagram Transport Layer Security (DTLS) security protocol or an Internet Protocol Security (IPSec) security protocol.

15. The client device of claim 11, wherein the data of the outgoing data packet is further encapsulated by an SSL layer, a second TCP layer, and a second IP layer.

* * * * *